(No Model.)
M. JACOBSON.
FOUR HORSE EQUALIZER.
No. 496,414. Patented May 2, 1893.
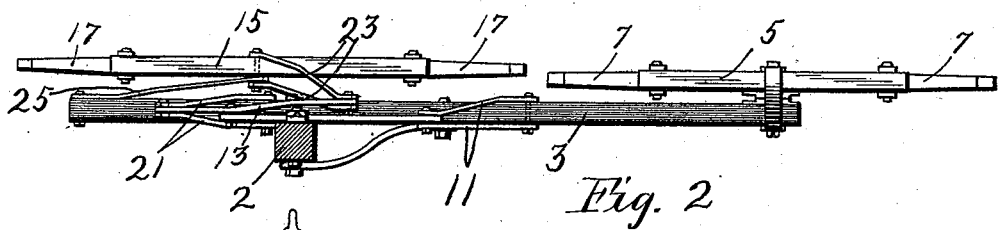
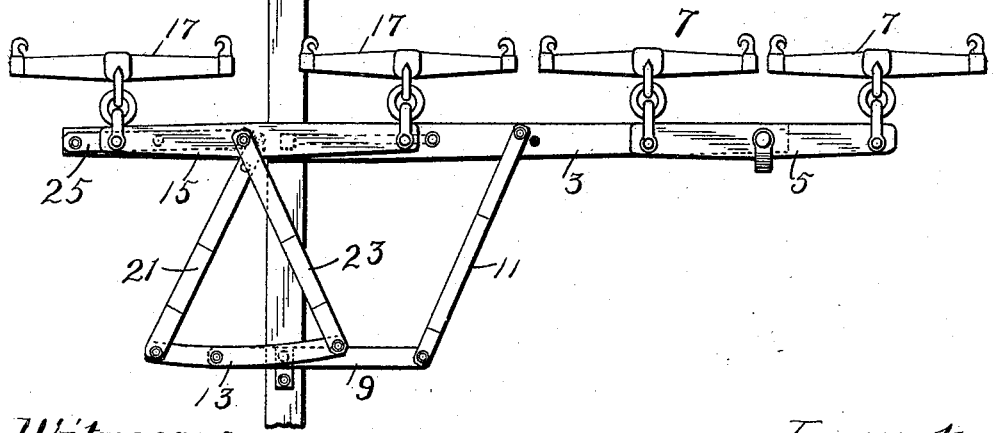
Witnesses
G. E. Purple
C. E. Van Doren
Inventor
Martin Jacobson
By Paul A. Merwin, Att'ys.

UNITED STATES PATENT OFFICE.

MARTIN JACOBSON, OF BERNADOTTE, MINNESOTA.

FOUR-HORSE EQUALIZER.

SPECIFICATION forming part of Letters Patent No. 496,414, dated May 2, 1893.

Application filed August 23, 1892. Serial No. 443,840. (No model.)

*To all whom it may concern:*

Be it known that I, MARTIN JACOBSON, a citizen of the United States, residing at Bernadotte, county of Nicollet, State of Minnesota, have invented a new and useful Four-Horse Equalizer, of which the following is a specification.

This invention relates to improvements in equalizers and especially to improvements in four horse equalizers, by means of which four horses may be connected to a grain binder or other machine—three of them being placed at one side of the pole and one upon the other side and the draft evenly applied to the machine so as to cause it to draw properly and keep in the desired position.

In the accompanying drawings, forming part of this specification, Figure 1 is a plan view of my improved device. Fig. 2 is a rear end elevation of the same, the pole being shown in section.

In the drawings, 2 represents the pole which may be of any ordinary or usual construction, and connected to the machine in the usual way. Pivoted upon this pole is the cross bar 3, to one end of which is secured the double tree 5, to which are secured the whiffle trees 7—so that the draft of the two horses attached to the whiffle trees 7, will be applied directly to the end of the cross bar 3. Arranged in the rear of the cross bar 3 is a short cross bar 9 which is connected by the bars 11 to the cross bar 3, at a point about midway between its end and the point at which it is pivoted to the pole. To the opposite end of the cross bar 9 is pivoted the swinging bar 13, the end of the bar toward the pole being preferably the longer and extending over the pole above the cross bar 9. The double tree 15, to which are connected the whiffle trees 17 is arranged above the cross bar 3, its center being just at one side of the pole, thereby bringing one whiffletree on each side of the pole and making three whiffletrees at one side of the pole and one at the other. A lever 21 is pivoted to the end of the cross bar 13 and to the cross bar 3 at a point near its pivotal attachment to the pole, and at the side of the pole upon which the one whiffle tree is located. This lever may be double and connected both to the upper and lower sides of the cross bar as shown in Fig. 2. A lever 23 is connected to the opposite end of the swinging bar 13 and to the center of the double tree 15, and a lever 25 is pivoted to the end of the cross bar 3 and also to the center of the double tree 15. With this construction the draft of the three horses upon one side is equalized and counteracted by the draft of the one horse upon the other side of the pole and the machine is properly guided thereby, and the difficulty usually experienced in guiding the machine and keeping it off from the grain is entirely obviated. By removing the double trees and attaching the whiffle trees directly to the cross bar 3 I may use the device as a three horse equalizer.

I claim as my invention—

The combination with the pole and the cross bar 3 pivoted thereto, and the double trees 5 and 15, of the cross bar 9 also pivoted to the pole, the swinging bar 13 also pivoted to the cross bar 9, the bar 11 pivoted to the cross bars 9 and 3, the lever 21 pivoted to the end of the swinging bar 13 and to the cross bar 3, the lever 23 pivoted to the other end of the swinging bar 13 and to the center of the double tree 15, and the lever 25 also pivoted to the end of the cross bar 3 and to the center of the double tree 15, substantially as described.

In testimony whereof I have hereunto set my hand this 18th day of August, 1892.

MARTIN JACOBSON.

In presence of—
I. M. OLSEN,
O. M. OLSEN.